(12) United States Patent
Sharpes

(10) Patent No.: US 11,557,984 B2
(45) Date of Patent: Jan. 17, 2023

(54) CLUTCH/BRAKE FOOTWEAR SYSTEM (71) Applicant: The Government of the United States, as represented by the Secretary of the Army, Washington, DC (US)

(72) Inventor: Nathan Sharpes, Abingdon, MD (US)

(73) Assignee: The Government of the United States, as represented by the Secretary of the Army, Washington, DC (US)

( * ) Notice: Subject to any disclaimer, the term of this patent is extended or adjusted under 35 U.S.C. 154(b) by 746 days.

(21) Appl. No.: 16/550,332

(22) Filed: Aug. 26, 2019

(65) Prior Publication Data
US 2020/0068985 A1 Mar. 5, 2020

Related U.S. Application Data

(60) Provisional application No. 62/724,824, filed on Aug. 30, 2018.

(51) Int. Cl.
| | |
|---|---|
| *A43B 21/24* | (2006.01) |
| *H02N 2/18* | (2006.01) |
| *F03G 5/06* | (2006.01) |
| *A43B 3/38* | (2022.01) |
| *F16D 67/02* | (2006.01) |
| *H02K 7/112* | (2006.01) |
| *A43B 3/42* | (2022.01) |
| *H02J 7/32* | (2006.01) |
| *H02K 7/18* | (2006.01) |
| *A43B 21/30* | (2006.01) |

(Continued)

(52) U.S. Cl.
CPC .............. *H02N 2/18* (2013.01); *A41D 1/002* (2013.01); *A43B 3/38* (2022.01); *A43B 21/24* (2013.01); *A43B 21/30* (2013.01); *F03G 5/063* (2021.08); *F16D 41/00* (2013.01); *F16D 67/02* (2013.01); *F16H 3/44* (2013.01); *F16H 57/10* (2013.01); *H02J 7/32* (2013.01); *H02K 7/112* (2013.01); *H02K 7/116* (2013.01); *H02K 7/1853* (2013.01); *A43B 3/42* (2022.01); *F16H 2200/0034* (2013.01); *F16H 2200/20* (2013.01); *F16H 2200/2005* (2013.01); *H02J 7/00032* (2020.01)

(58) Field of Classification Search
CPC . F03G 5/08; F03G 5/063; F03G 5/066; H02P 9/04; H02N 11/002; H02N 2/18; A43B 3/38; A43B 21/24; A43B 21/30; A41D 1/002; F16H 57/10
See application file for complete search history.

(56) References Cited

U.S. PATENT DOCUMENTS

| | | | | |
|---|---|---|---|---|
| 4,936,030 A | * | 6/1990 | Rennex | A43B 13/18 36/102 |
| 7,605,482 B2 | * | 10/2009 | Brown | H02K 35/02 290/1 R |

(Continued)

*Primary Examiner* — Burton S Mullins
(74) *Attorney, Agent, or Firm* — Ronald Krosky (57) ABSTRACT

A footwear system can employ a brake and/or a clutch, such as a one-way clutch, to convert human motion into usable electricity. The brake and one-way clutch can be used together, such as on opposite ends of a spring. During a storage phase, the brake can be engaged and the one-way clutch disengaged so the spring stores an energy. After the storage phase, the brake can be removed to initiate the release phase since the brake is not stopping the spring, but the one-way clutch allows the stored energy to be released.

19 Claims, 12 Drawing Sheets

(51) Int. Cl.
    *F16D 41/00*     (2006.01)
    *A41D 1/00*     (2018.01)
    *F16H 3/44*     (2006.01)
    *F16H 57/10*     (2006.01)
    *H02K 7/116*     (2006.01)
    *H02J 7/00*     (2006.01)

(56) References Cited

U.S. PATENT DOCUMENTS

| | | | |
|---|---|---|---|
| 7,645,246 B2 * | 1/2010 | Rastegar | A63B 21/00178 601/5 |
| 8,062,237 B2 * | 11/2011 | Rastegar | A61H 3/00 601/5 |
| 9,289,316 B2 * | 3/2016 | Ward | A61F 2/70 |

* cited by examiner

CLUTCH/BRAKE FOOTWEAR SYSTEM

CROSS-REFERENCE

This application claims priority to U.S. Provisional Application No. 62/724,824 filed on Aug. 30, 2018. U.S. Provisional Application No. 62/724,824 is hereby incorporated by reference.

GOVERNMENT INTEREST

The innovation described herein may be manufactured, used, imported, sold, and licensed by or for the Government of the United States of America without the payment of any royalty thereon or therefor.

BACKGROUND

Batteries can be used to store energy. In one example, a cellular telephone or radio can be powered by batteries. Without being physically tethered to a wall outlet, this gives the user a great amount of physical freedom when using the cellular telephone or radio.

However, batteries have a finite storage capacity. The cellular telephone or radio can drain a battery until the battery is drained. Therefore, the cellular telephone or radio can have a limited amount of usage until the battery is replaced or recharged.

SUMMARY

In one embodiment, a footwear system can comprise a spring with a first end and a second end opposite the first end. The footwear system can also comprise a clutch configured to be coupled to the first end. The footwear system can additionally comprise a brake configured to be coupled to the second end. During a storage phase of the spring, the clutch can be mobile and the brake can be engaged. During a release phase of the spring the clutch can be immobile and the brake can be disengaged. The spring can be displacement-proportional.

In another embodiment, a method can be performed by a footwear system. The method can comprise engaging a one-way clutch of the footwear system during a first phase such that a spring loads with an energy during a heel strike. The method can also comprise disengaging the one-way clutch of the footwear system during a second phase such that the spring releases the loaded energy during a heel lift. The second phase can follow the first phase. During the first phase, the one-way clutch can move from a first position to a second position and during the second phase, the one-way clutch can remain in the second position. The first position and the second position can be different positions.

In yet another embodiment, a method can be performed by a footwear system. The method can comprise engaging a brake of the footwear system during a first phase such that a spring loads with an energy during a heel strike. The method can also comprise disengaging the brake of the footwear system during a second phase such that the spring releases the loaded energy during a heel lift. The second phase can follow the first phase.

BRIEF DESCRIPTION OF THE DRAWINGS

Incorporated herein are drawings that constitute a part of the specification and illustrate embodiments of the detailed description. The detailed description will now be described further with reference to the accompanying drawings as follows:

Multiple figures can be collectively referred to as a single figure. For example, FIGS. 2A-2D illustrate four separate figures, but can collectively be referred to as 'FIG. 2."

DETAILED DESCRIPTION

A person can wear hardware that converts physical motion into electrical energy. The electrical energy can recharge a battery, such as a battery of a personal electronic device (e.g., a cellular telephone or radio). In one embodiment, leg motion from walking or running can be leveraged to produce battery charging energy.

The following includes definitions of selected terms employed herein. The definitions include various examples. The examples are not intended to be limiting.

"One embodiment", "an embodiment", "one example", "an example", and so on, indicate that the embodiment(s) or example(s) can include a particular feature, structure, characteristic, property, or element, but that not every embodiment or example necessarily includes that particular feature, structure, characteristic, property, or element. Furthermore, repeated use of the phrase "in one embodiment" may or may not refer to the same embodiment.

"Computer-readable medium", as used herein, refers to a medium that stores signals, instructions and/or data. Examples of a computer-readable medium include, but are not limited to, non-volatile media and volatile media. Non-volatile media may include, for example, optical disks, magnetic disks, and so on. Volatile media may include, for example, semiconductor memories, dynamic memory, and so on. Common forms of a computer-readable medium may include, but are not limited to, a floppy disk, a flexible disk, a hard disk, a magnetic tape, other magnetic medium, other optical medium, a Random Access Memory (RAM), a Read-Only Memory (ROM), a memory chip or card, a memory stick, and other media from which a computer, a processor or other electronic device can read. In one embodiment, the computer-readable medium is a non-transitory computer-readable medium.

"Component", as used herein, includes but is not limited to hardware, firmware, software stored on a computer-readable medium or in execution on a machine, and/or combinations of each to perform a function(s) or an action(s), and/or to cause a function or action from another component, method, and/or system. Component may include a software controlled microprocessor, a discrete component, an analog circuit, a digital circuit, a programmed logic device, a memory device containing instructions, and so on. Where multiple components are described, it may be possible to incorporate the multiple components into one physical component or conversely, where a single component is described, it may be possible to distribute that single component between multiple components.

"Software", as used herein, includes but is not limited to, one or more executable instructions stored on a computer-readable medium that cause a computer, processor, or other electronic device to perform functions, actions and/or behave in a desired manner. The instructions may be embodied in various forms including routines, algorithms, modules, methods, threads, and/or programs, including separate applications or code from dynamically linked libraries.

In energy conversion devices, the rate at which energy is converted from one form to another, or power, can be the primary attribute of a system. The power output from such a system can be in direct proportion to the power available from a source. There is then an effect on the source resulting from this energy conversion, called damping. Damping is a non-restorative force, meaning energy is leaving the source system and is not returned. Damping is also rate proportional, meaning the greater the rate of energy conversion, the greater the resistance to motion. In the case of a human worn system (e.g., an exoskeleton) the human body can be the input source of power. Damping effects on the body result in the body having to perform more work, increasing metabolic expenditure and fatigue.

There is consequently a time penalty associated with energy conversion. The faster energy is converted, the more power is demanded from the source, tending to slow it down or yearn for increased input power to keep up with output power demands. In the context of harvesting energy from human motion, damping is a highly undesirable trait. By its nature, interacting with a damper (a source of damping) causes undue forces on the body which oppose and do not aid (e.g., are non-restorative) the body's motion.

An example of a damper is an electromagnetic generator, which converts mechanical energy into electrical energy. The faster the generator is made to spin, the more mechanical force is required (counter-torque), and the quicker the motion, the more pronounced the effect (e.g., it is velocity proportional). The tradeoff is inherent between performance and comfort, as comfort operates on slower time scales while performance is achieved on faster time scales. Coupling an electromagnetic generator to the body to harvest energy is an attempted union of disagreeable timing.

Figure 1:
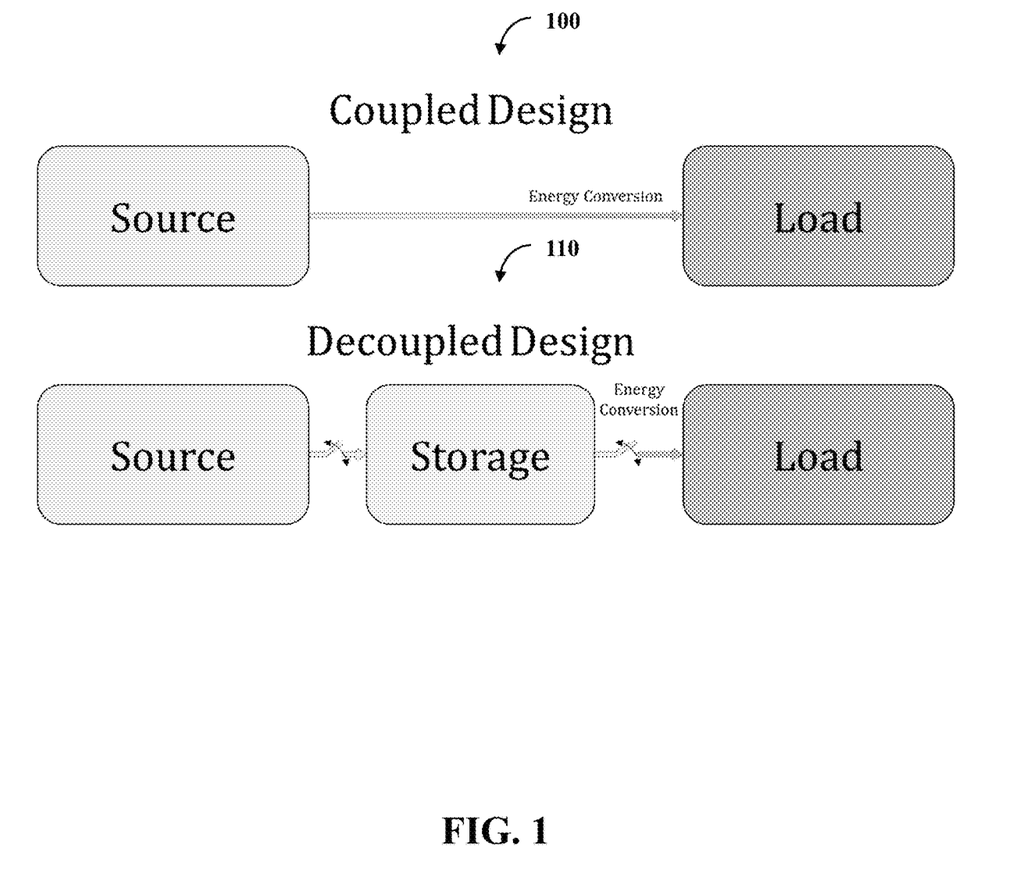
FIG. 1 illustrates one embodiment of a coupled design and a decoupled design.

FIG. 1 illustrates one embodiment of two designs—a coupled design 100 and a decoupled design 110. In coupled devices practicing the coupled design 100, a gear ratio can be employed to speed-up the relatively slower motion input from the body, for a generator. Adding a gear ratio thus corrects in the issue of time scale disparity, however, it also multiplies the effects of damping.

If power is to be harvested from human motion, the collection of energy from the body can be decoupled in time from the energy conversion, so as to avoid the effects of damping on the body. This can be achieved with the decoupled design 110. Decoupling, as a result, can introduce an intermediary energy storage element (e.g., a spring) into the system. In this way, energy can be collected from a source (e.g. the body) at an arbitrary time scale, stored, and later converted. Given the appropriate storage element, energy collection and conversion can happen in their respective desired time scales.

This energy harvesting strategy then calls into question the storage element. The storage element can function to not collect energy in a rate (e.g., having a time aspect) proportional manner, in order for decoupling to be possible. For example, a spring stores energy proportional to displacement. There is no time component of displacement (e.g., meters) like there is for velocity (e.g., meters per second, rotations per minute, etc.). It is of little consequence how quickly a spring is displaced, the same amount of energy is stored. Additionally, to avoid damping, energy conversion does not take place going from the source to storage elements, just energy transfer. This means that energy is be stored in the manner in which it is derived from the source.

For human motion, a mechanical movement, energy can be stored in a mechanical device (e.g., the spring) to avoid energy conversion (e.g., storage alone) and subsequently introducing damping. Not only is human motion a mechanical movement, but it is intermittent and cyclic in nature. Human gait has periods of active (muscle driven) and passive (inertia driven) motions. Therefore, energy can be collected (e.g., stored) during certain periods of gait and that stored energy can be converted during other time periods. In one example, energy is collected during a muscle driven phase and converted during an inertia driven phase.

FIGS. 2A-2D illustrate four embodiments of action sequences 200-230 for different springs—a compression spring in 200, a tension spring in 210, a power spring in 220, and a torsion spring in 230 (with the spring housing being shown as transparent in 230 to show torsion spring inside). In FIG. 2, the springs can be displacement proportional with a first end and a second end. The spring can be linear (e.g., the compression spring in 200 or the tension spring in 210) or rotational (e.g., the power spring in 220 and the torsion spring in 230). For the linear springs, the first end and second end can be opposed in one another in that they are on distinct sides. For rotational springs, the first end (or second end) can be an outside edge and the second end (or first end) can be an inner edge.

The spring can be associated with a clutch (e.g., a one-way clutch) coupled to the first end of the spring and a brake on the second end of the spring. During a storage phase of the spring (e.g., a heel down strike), the clutch can be mobile and the brake can be engaged. During a release phase (e.g., heel lift), the clutch can be immobile and the brake can be disengaged.

In an example operation, a force (be it linear or rotational) is applied to through the clutch at one end of the spring. The clutch can be oriented such that it transfers displacement (e.g., linear or rotational) in the direction of the applied force. The brake (e.g., temporary brake) can be applied at the opposite end of the spring. In this configuration, the force causes deformation of the spring and energy to be stored. When the force comes to an end, the one-way clutch prevents the spring from returning back to its original position. The temporary brake is removed and the spring reacts to release the stored energy. Movement occurs on the opposite side of the spring from where the force is applied. On this side of the spring would attach the energy conversion device, such as a generator (e.g., an electromagnetic alternator). For rotational springs (e.g., the power spring of the design 220 (with a three-dimensional illustrates of the spring and housing being in portion 'g') and the torsion spring of the design 230 (with a three-dimensional illustrates of the spring and housing being in portion 'g', with part of the housing transparent to show the torsion spring inside)), the temporary brake is then applied again, ready for the next force input. For linear type spring, (e.g., the compression spring of the design 200 and the tension spring of the design 210), the spring can first be translated back to its original position by a reset mechanism (e.g., designated in FIG. 2A by reset), first, by disengaging the one-way clutch, before the temporary brake and one-way clutch can again be applied, ready for the next force input.

Figure 2A:
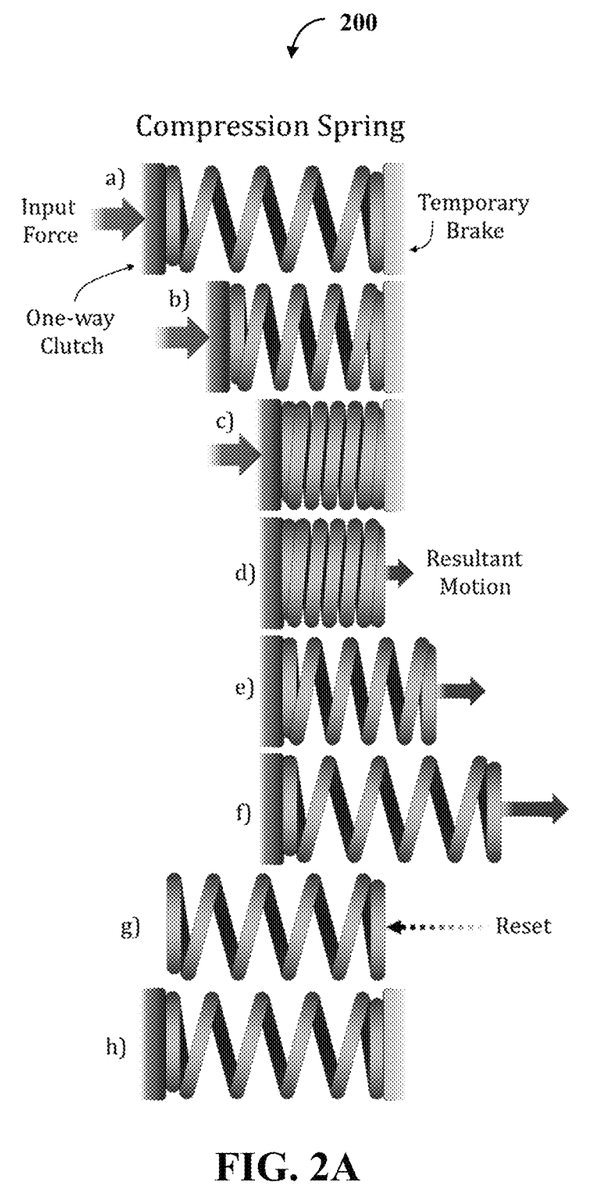
FIGS. 2A-2D illustrate four embodiments of action sequences.
Figure 2B:
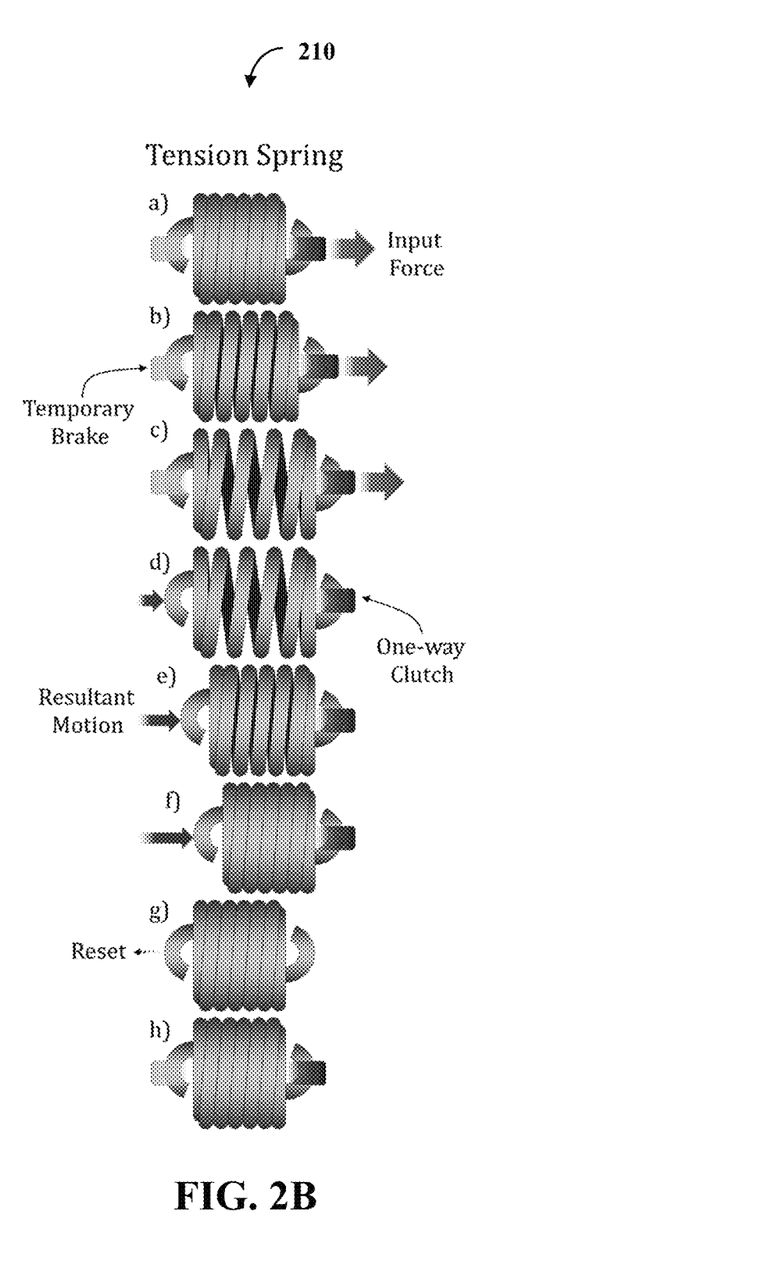

For the linear springs, at the start of the storage phase the clutch is at a first clutch location and the brake is at a first brake location. At the end of the release phase the clutch is at a second clutch location and the brake is at a second brake location (e.g., removed from the spring. The reset mechanism can be configured to return the clutch to the first clutch location and the brake to the first brake location after the end of the release phase. The storage phase (e.g., during a heel strike) can store an amount of an energy and the release phase (e.g., during a heel lift) can release at least part of the amount of energy (e.g., all of the stored energy minus losses due to physical/environmental factors).

Figure 3:
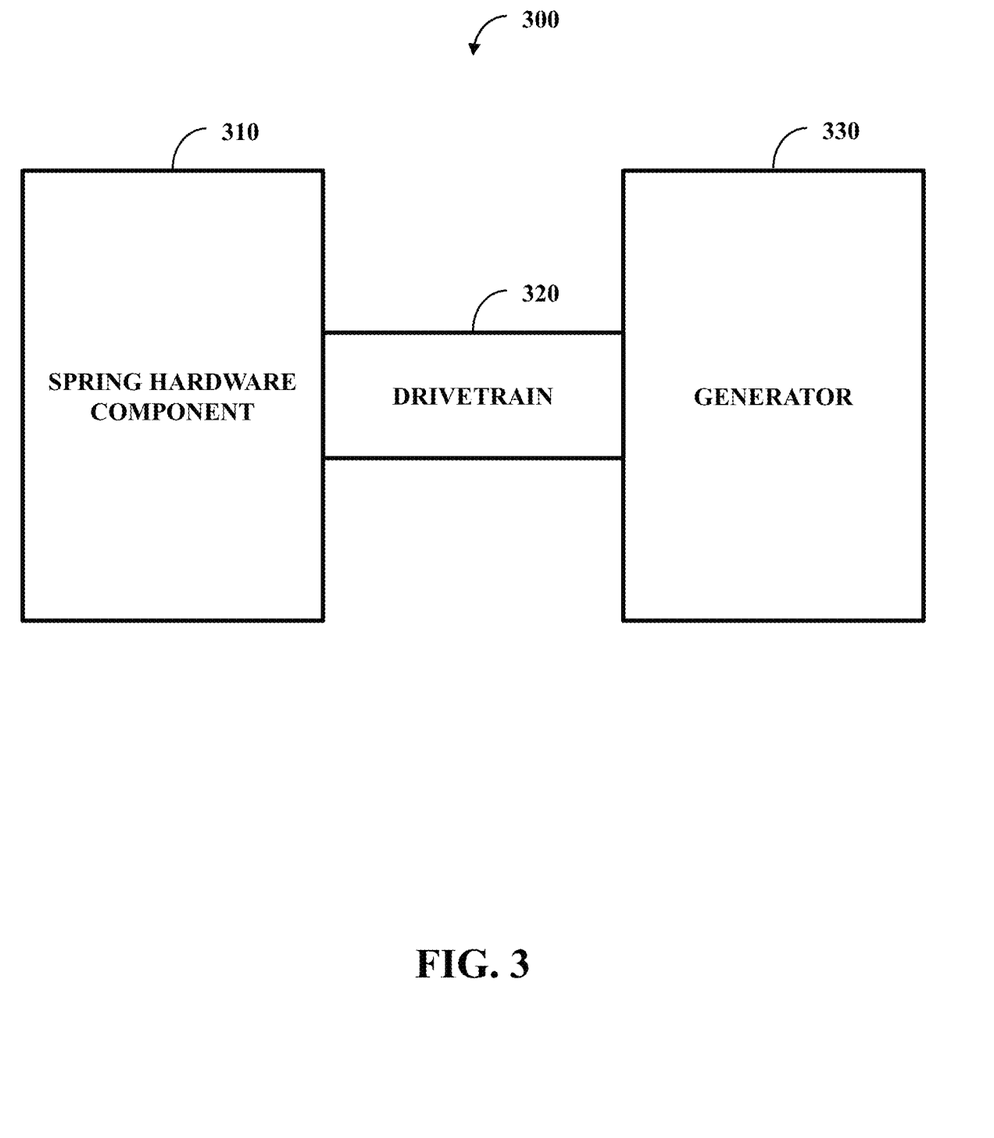
FIG. 3 illustrates one embodiment of a system comprising a spring hardware component, a drivetrain, and a generator.

FIG. 3 illustrates one embodiment of a system 300 comprising a spring hardware component 310, a drivetrain 320, and a generator 330. The spring hardware component 310 can comprise a spring (e.g., a linear spring or a rotational spring), the reset mechanism, the clutch, and/or the brake. The spring hardware component can physically couple to the drivetrain 320 and the drivetrain 320 can physically couple to the generator 330. The drivetrain 320 can function as a transfer hardware component and be configured to transfer released energy from the spring hardware component 310 to the generator 330. The generator 330 can employ the released energy to produce a power.

In one embodiment, with the spring being a rotational spring, during the release phase, the drivetrain 320 rotates. Rotation of the drivetrain 320 can cause rotation of a part of the generator. Rotation of the part of the generator 330 can cause the generator 330 to produce a power (e.g., electricity) that can cause a battery to be charged, such as a battery of a personal electronic device employed by a wearer of the system 300.

In one embodiment, the spring hardware component 310 comprises a linear spring and the reset mechanism. The released energy can be in at least two parts. The first part of the released energy can power the generator 330. As an example of this, the linear spring can move a gear set that functions as the drivetrain 320 and the gear set can cause a part of the generator 330 (e.g., electro-mechanical generator) to rotate. A second part of the released energy powers the reset mechanism to return the clutch to the first clutch location and return the brake to the first brake location.

Figure 4:
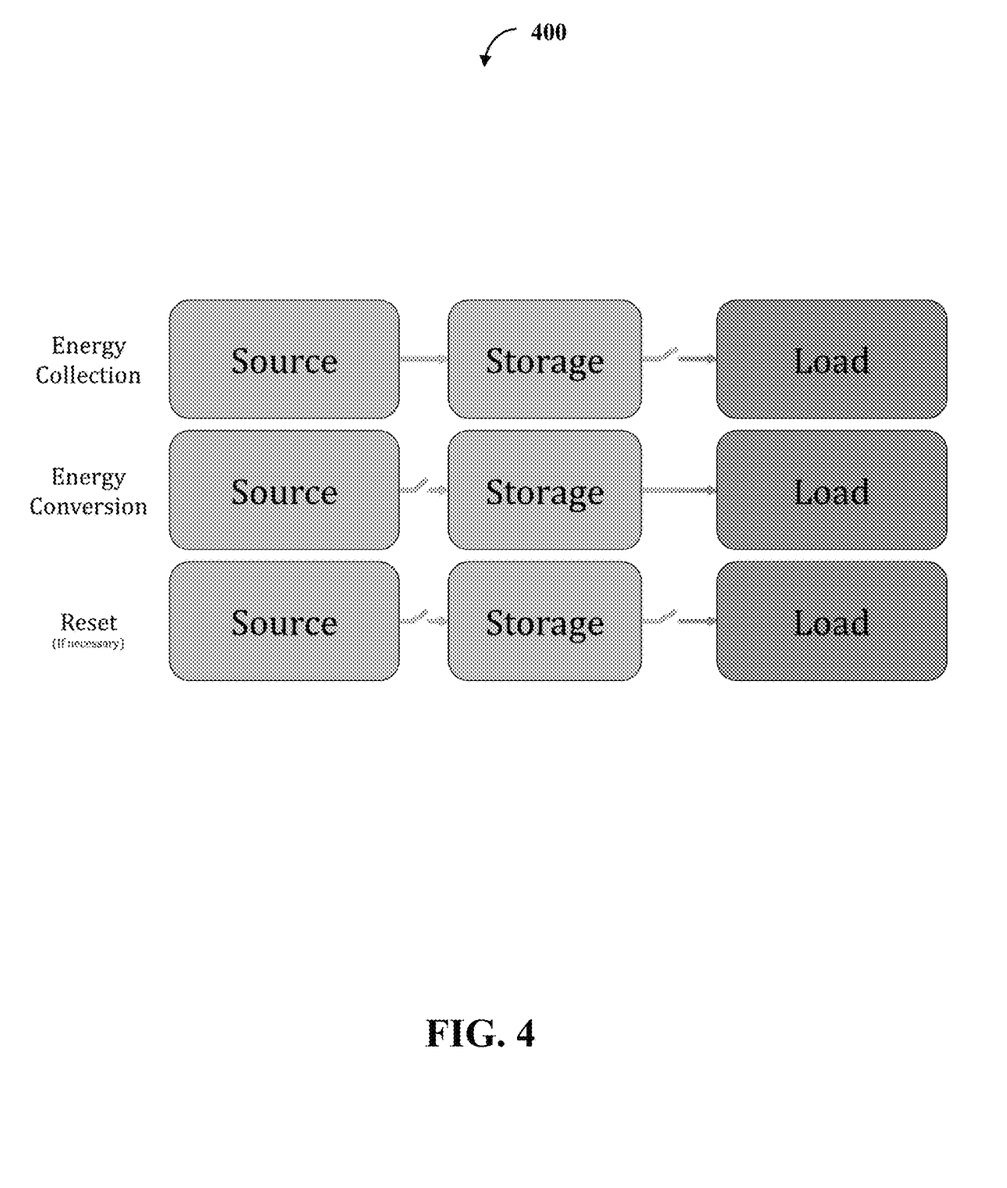
FIG. 4 illustrates one embodiment of an arrangement for energy flow conceptualization.

FIG. 4 illustrates one embodiment of an arrangement 400 for energy flow conceptualization. The rate of energy release from the spring storage may be limited by the damping of the energy conversion device. In this way, energy is input to the storage spring at a rate that is natural to the body's motion, but released in a rapid manner suitable for higher power output from the energy conversion stage. Both the energy collection and conversion can take place in their own efficient time scales, and damping effects on the source (e.g., human body) are circumvented.

A problem with energy harvesting from human motion using a coupled design is that it is undesirable to increase the metabolic rate (the rate the body consumes energy) of the device wearer, so the body would do more work than normal for energy to be harvested (e.g., overcome inertia and damping of mechanical devices to function). The energy harvester can produce electricity, but the wearer could work harder and subsequently become fatigued faster, possibly negating the benefit of producing electricity in the first place.

One example can be a hiker is following the direction of a portable Global Positioning System unit, the batteries of which are charge by a wearable coupled energy harvester. Though direction is given, the hiker could become prematurely fatigued and require rest.

The arrangement 400 can cause the wearer to not be directly interacting with a source of damping (e.g., the energy harvester itself, such as the generator 330 of FIG. 3), but rather interacting with a spring. The spring then interacts with the source of damping so the wearer does not have to and therefore the wearer expends less energy. The spring is not velocity proportional, but instead is displacement proportional. This is also a more normal feeling experience for the human body as many tendons function like springs.

Figure 2C:
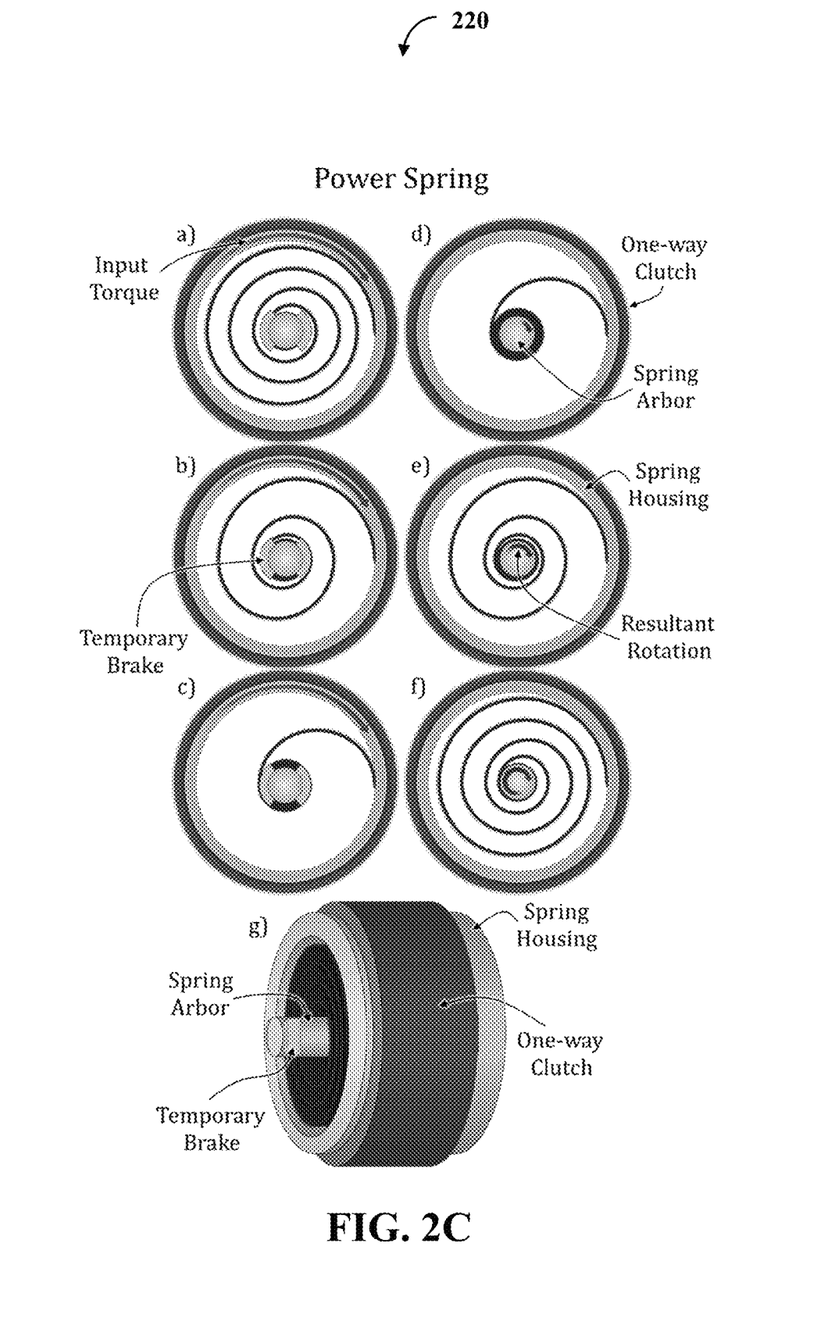
Figure 2D:
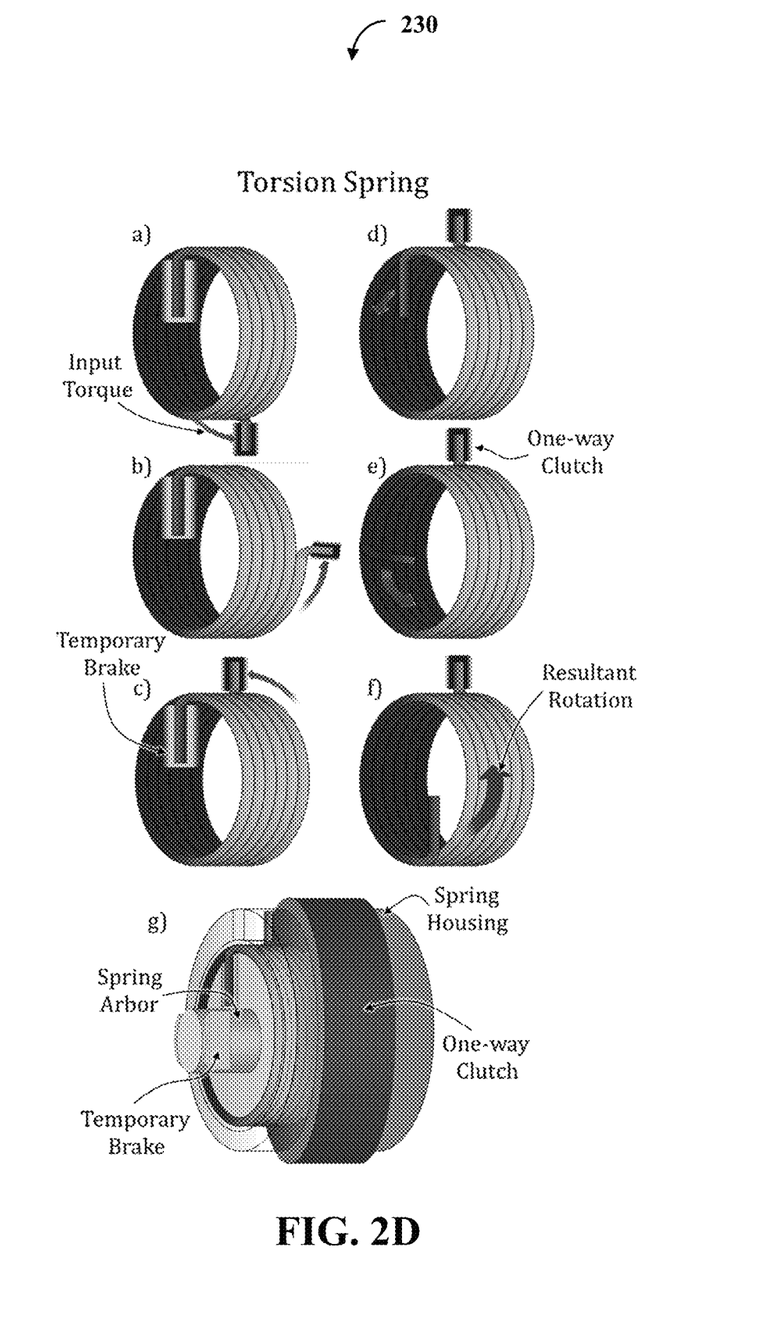

In one example, if the torsion spring design 230 of FIG. 2D is embodied in an ankle exoskeleton or boot. The input torque from ankle rotation during gait winds the spring while the force from the heel hold the temporary brake against the spring during stance phase of gait. When the heel is lifted, the spring is allowed to unwind and turn the generator.

Figure 5:
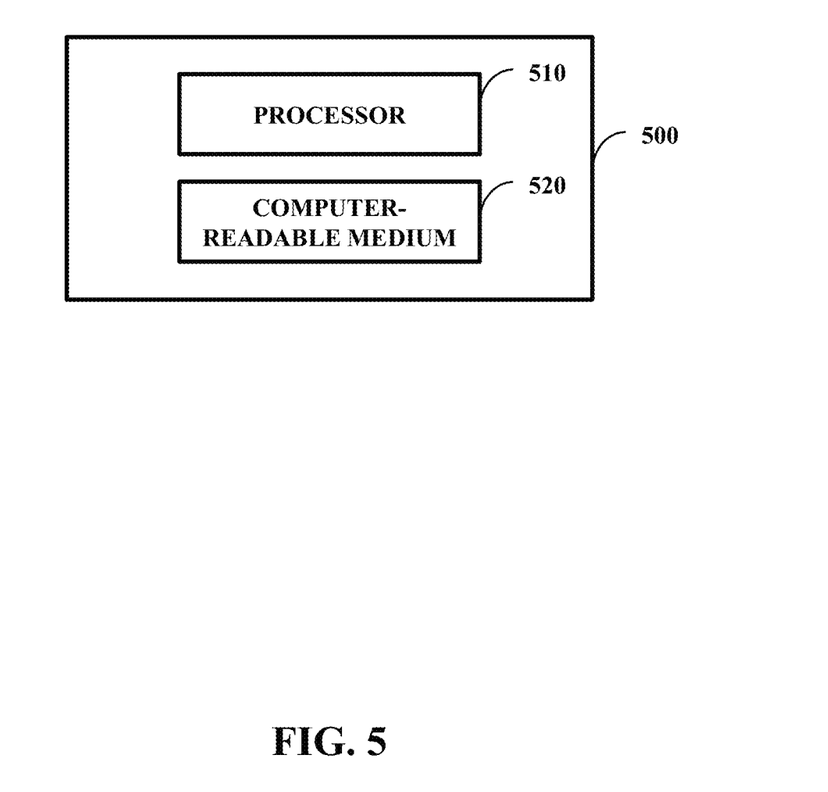
FIG. 5 illustrates one embodiment of a system comprising a processor and a computer-readable medium.

FIG. 5 illustrates one embodiment of a system 500 comprising a processor 510 and a computer-readable medium 520 (e.g., non-transitory computer-readable medium). In one embodiment, the computer-readable medium 520 is communicatively coupled to the processor 510 and stores a command set executable by the processor 510 to facilitate operation of at least one component disclosed (e.g., a reception component configured to receive design plans for a footwear system disclosed herein). In one embodiment, at least one component disclosed herein (e.g., construction component configured to manage construction of a footwear system disclosed herein in accordance with the design plans) can be implemented, at least in part, by way of non-software, such as implemented as hardware by way of the system 500. In one embodiment, the computer-readable medium 520 is configured to store processor-executable instructions that when executed by the processor 510, cause the processor 510 to perform at least part of a method disclosed herein (e.g., at least part of the method 600-900 discussed below).

Figure 6:
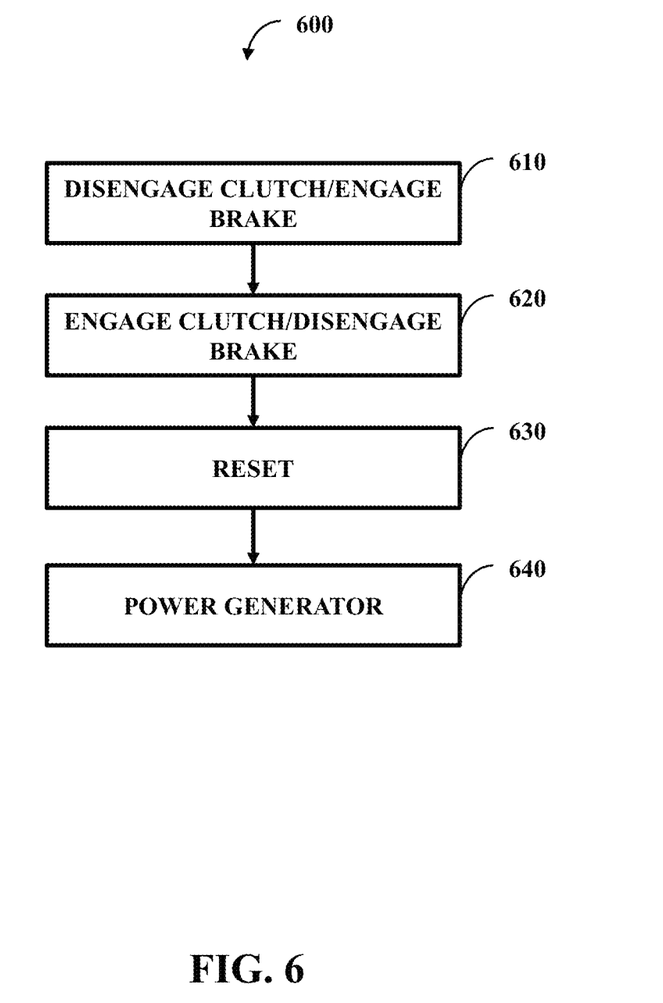
FIG. 6 illustrates one embodiment of a method comprising four actions.

FIG. 6 illustrates one embodiment of a method 600 comprising four actions 610-640. At least part of the method 600 can be practiced with the at least some designs disclosed herein, but will be discussed with regard to the design 200 of FIG. 2A for clarity purposes and as such a linear spring (e.g., compression spring) is used as an example. At 610, a one-way clutch of the design 200 of FIG. 2A can be disengaged (e.g., be in a state of allowing compression on a first end) and a brake can be engaged (e.g., be in a state of preventing movement of a second end so compression can occur). This brake engagement and clutch disengagement can be during a first phase such that the spring loads with a torque from ankle dorsiflexion during stance phase of gait and brake engagement is caused by heel strike. At 620, the one-way clutch of the design 200 of FIG. 2A can be engaged (e.g., be in a state of preventing movement on the first end) and the brake can be disengaged (e.g., be in a state of allowing movement from the second end so decompression can occur). This brake disengagement and clutch engagement can be during a second phase such that the spring releases the loaded energy during a heel lift. During the first phase the one-way clutch moves from a first position to a second position different from the first position and during the second phase, which follows the first phase, the one-way clutch remains in the second position.

At 630, the one-way clutch can be returned to the first position after the end of the second phase. Along with returning the clutch, the spring can be physically moved at 630 to cause a reset of the spring and one-way clutch. This can be achieved through employment of at least part of the loaded energy released by the spring during the heel lift. At 640, the loaded energy released by the spring during the heel lift can be employed to power a generator. The generator, brake, one-way clutch, and spring can be part of a footwear system.

Figure 7:
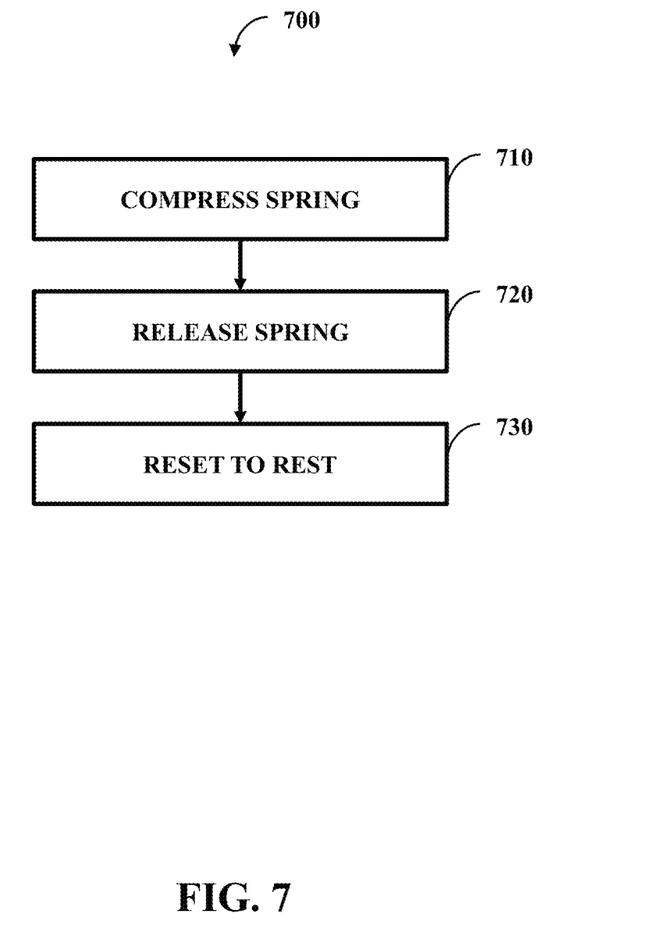
FIG. 7 illustrates one embodiment of a method comprising three actions.

FIG. 7 illustrates one embodiment of a method 700 comprising three actions 710-730; these actions can align with portions a-h of FIG. 2A. At 710, force can be imparted on the spring from a source of mechanical energy, such as a human body heel strike (see portion 'a'). The one way clutch, as being engaged, can allow the force to freely push the spring to the right and the temporary brake can keep the spring from simply translating under forcer, allowing for compression of the spring and energy to be stored in the spring (see portion 'b'). The source reaches the end of its stroke (e.g., heel strike completes) and the spring is maximally compressed (see portion 'c').

At 720, the temporary brake can be removed; even though the force is no longer acting on the spring, the one way clutch prevents it from pushing to the left (see portion 'd'). As a result, the spring pushes to the right, where an energy conversion stage can connect (see portion 'e') and the spring can finish elongating with maximum speed (e.g., see portion 'f').

At 730, the one way clutch can be disengaged and the spring is reset to its original position (see portion 'g'). The one way clutch and temporary brake can be reengaged ready for the next input force cycle (see portion 'h'). As one can visually see, portion 'a' and portion 'h' match.

Figure 8:
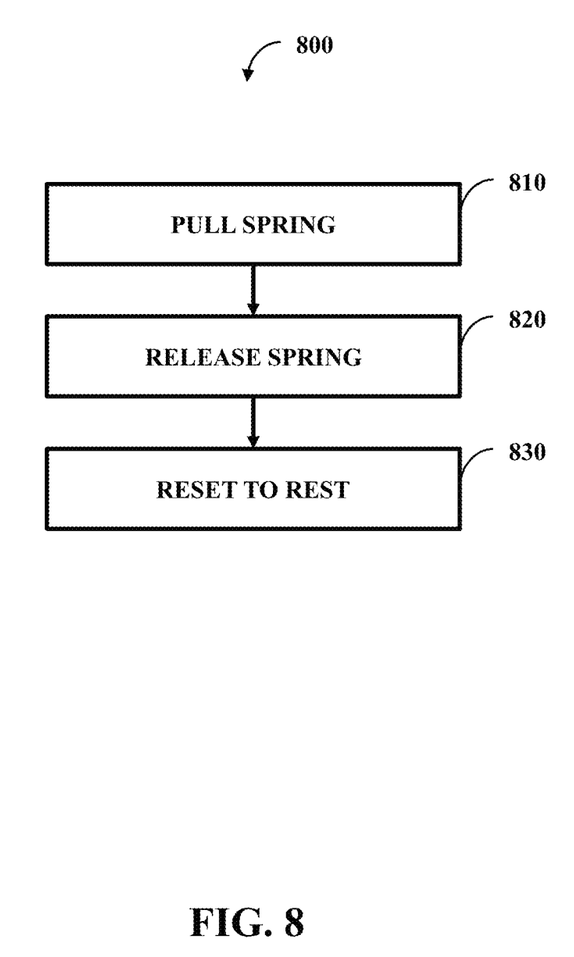
FIG. 8 illustrates one embodiment of a method comprising three actions.

FIG. 8 illustrates one embodiment of a method 800 comprising three actions 810-830; these actions can align with portions a-h of FIG. 2B. At 810, force can be imparted on the spring from a source of mechanical energy, such as a human body heel strike (see portion 'a'). The one way clutch, as being engaged, can allow the force to freely pull the spring to the right; the temporary brake keeps the spring from simply translating under forcer, allowing for extension and energy to be stored (see portion 'b'). The source reaches the end of its stroke (e.g., heel strike completes) and the spring is maximally extended (see portion 'c').

At 820, the temporary brake can be removed; even though the force is no longer acting on the spring, the one way clutch prevents it from pulling to the left (see portion 'd'). As a result, the spring pulls to the right, where an energy conversion stage would connect (see portion 'e'). The spring finishes contracting with maximum speed (see portion 'f').

At 830, the one way clutch is disengaged and the spring is reset to its original position (see portion 'g'). The one way clutch and temporary brake are reengaged ready for the next input force cycle (see portion 'h'). As one can visually see, portion 'a' and portion 'h' match.

Figure 9:
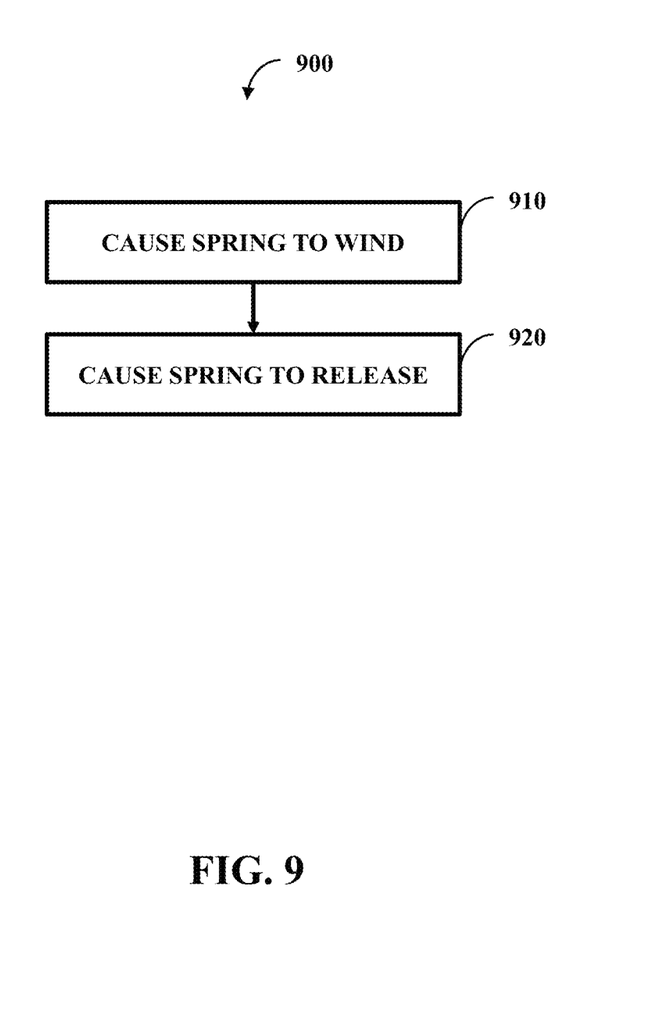
FIG. 9 illustrates one embodiment of a method comprising two actions.

FIG. 9 illustrates one embodiment of a method 900 comprising two actions 910-920; these actions can align with portions a-g of FIG. 2C as well as portions a-g of FIG. 2D. In light of FIG. 2C, at 910, torque can be imparted on the spring from a source of mechanical energy, such as a human body heel strike (see portion 'a'). The one way clutch can allow the torque to freely rotate the spring housing clockwise; a temporary brake can keep the spring arbor from simply rotating under torque, allowing for winding and energy to be stored (see portion 'b'). The source reaches the end of its turn and the spring is maximally wound (see portion 'c'). At 920, the temporary brake can be removed from the spring arbor; even though the torque is no longer acting on the spring housing, the one way clutch prevents it from unwinding counter-clockwise (see portion 'd'). As a result, the spring arbor, where an energy conversion stage can connect, rotates clockwise (see portion 'e'). The spring finishes unwinding with maximum speed (see portion 'f').

In light of FIG. 2D, at 910, torque can be imparted on the spring from a source of mechanical energy, such as a human body joint rotation (see portion 'a'). The one way clutch can allow the torque to freely rotate the spring housing clockwise; a temporary brake keeps the spring arbor from simply rotating under torque, allowing for winding and energy to be stored (see portion 'b'). The source reaches the end of its turn and the spring is maximally wound (see portion 'c'). At 920, the temporary brake can be removed from the spring arbor; even though the torque is no longer acting on the spring housing, the one way clutch prevents it from unwinding counter-clockwise (see portion 'd'). As a result, the spring arbor, where an energy conversion stage would connect, rotates clockwise (see portion 'e'). The spring finishes unwinding with maximum speed (see portion 'f').

While the methods disclosed herein are shown and described as a series of blocks, it is to be appreciated by one of ordinary skill in the art that the methods are not restricted by the order of the blocks, as some blocks can take place in different orders. Similarly, a block can operate concurrently with at least one other block. Additionally, at least one method disclosed herein can be practiced with less than the illustrated blocks. For example, the method 600 of FIG. 6 can function without the reset action 630 when a rotational spring is employed.

What is claimed is:

1. A footwear system, comprising:
   a spring with a first end and a second end opposite the first end;
   a clutch configured to be coupled to the first end; and
   a brake configured to be coupled to the second end,
   where during a storage phase of the spring the clutch is mobile and the brake is engaged,
   where during a release phase of the spring the clutch is immobile and the brake is disengaged, and
   where the spring is displacement-proportional.

2. The footwear system of claim 1,
   where the spring is a linear spring.

3. The footwear system of claim 2, comprising:
   a reset mechanism,
   where at the start of the storage phase the clutch is at a first clutch location and the brake is at a first brake location,
   where at the end of the release phase the clutch is at a second clutch location and the brake is at a second brake location,
   where the reset mechanism is configured to return the clutch to the first clutch location and the brake to the first brake location after the end of the release phase.

4. The footwear system of claim 3,
   where the storage phase stores an amount of an energy,
   where the release phase releases at least part of the amount of the energy,
   where a first part of the released energy powers a generator, and
   where a second part of the released energy powers the reset mechanism to return the clutch to the first clutch location and return the brake to the first brake location.

5. The footwear system of claim 2,
   where the spring is a compression spring.

6. The footwear system of claim 2,
where the spring is a tension spring.

7. The footwear system of claim 1,
where the spring is a rotational spring.

8. The footwear system of claim 7,
where the spring is a power spring.

9. The footwear system of claim 7,
where the spring is a torsion spring.

10. The footwear system of claim 1, comprising:
a transfer hardware component; and
a generator,
where the storage phase stores an energy,
where the reset phase releases the energy,
where the transfer hardware is configured to transfer the released energy from the spring to the generator,
where the generator employs the released energy to produce a power.

11. The footwear system of claim 1,
where the power charges a battery of a personal electronic device employed by a wearer of the footwear system.

12. The footwear system of claim 1,
where the storage phase is during a heel strike and
where the release phase is during a heel lift.

13. A method, performed by a footwear system, the method comprising:
engaging a one-way clutch of the footwear system during a first phase such that a spring loads with an energy during a heel strike; and
disengaging the one-way clutch of the footwear system during a second phase such that the spring releases the loaded energy during a heel lift,
where the second phase follows the first phase,
where during the first phase, the one-way clutch moves from a first position to a second position,
where during the second phase, the one-way clutch remains in the second position, and where the first position and the second position are different positions.

14. The method of claim 13, comprising:
disengaging a brake of the footwear system during the first phase such that the spring loads with the energy during the heel strike; and
engaging the brake of the footwear system during the second phase such that the spring releases the loaded energy during the heel lift.

15. The method of claim 13, comprising:
returning the one-way clutch to the first position after the end of the second phase,
where the spring is a linear spring.

16. The method of claim 13, comprising:
employing at least part of the loaded energy released by the spring during the heel lift to power a generator,
where the spring is part of the footwear system and
where the generator is part of the footwear system.

17. A method, performed by a footwear system, the method comprising:
engaging a brake of the footwear system during a first phase such that a spring loads with an energy during a heel strike;
disengaging the brake of the footwear system during a second phase such that the spring releases the loaded energy during a heel lift;
disengaging a one-way clutch of the footwear system during the first phase such that the spring loads with the energy during the heel strike;
engaging the one-way clutch of the footwear system during the second phase such that the spring releases the loaded energy during the heel lift; and
returning the one-way clutch to a first position after the end of the second phase,
where the second phase follows the first phase,
where the spring is a linear spring,
where the second phase follows the first phase,
where during the first phase, the one-way clutch moves from the first position to a second position,
where during the second phase, the one-way clutch remains in the second position, and where the first position and the second position are different positions.

18. The method of claim 17,
where returning the one-way clutch to a first position after the end of the second phase is achieved through employment of at least part of the loaded energy released by the spring during the heel lift.

19. The method of claim 18, comprising:
employing at least part of the loaded energy released by the spring during the heel lift to power a generator,
where the spring is part of the footwear system and
where the generator is part of the footwear system.

* * * * *